US010270560B2

(12) United States Patent
Ueno

(10) Patent No.: US 10,270,560 B2
(45) Date of Patent: Apr. 23, 2019

(54) COMMUNICATION DEVICE AND RETRANSMISSION CONTROL METHOD

(71) Applicant: RENESAS ELECTRONICS CORPORATION, Tokyo (JP)

(72) Inventor: Tomokuni Ueno, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/683,220

(22) Filed: Aug. 22, 2017

(65) Prior Publication Data

US 2018/0062793 A1 Mar. 1, 2018

(30) Foreign Application Priority Data

Aug. 23, 2016 (JP) ................... 2016-162755

(51) Int. Cl.
*H04L 1/14* (2006.01)
*H04L 1/08* (2006.01)
*H04L 5/14* (2006.01)
*H04L 29/06* (2006.01)
*H04L 29/08* (2006.01)

(52) U.S. Cl.
CPC .............. *H04L 1/08* (2013.01); *H04L 5/14* (2013.01); *H04L 69/22* (2013.01); *H04L 69/324* (2013.01); *H04L 67/12* (2013.01)

(58) Field of Classification Search
CPC ... H04L 1/08; H04L 5/14; H04L 69/22; H04L 69/324; H04L 67/12
See application file for complete search history.

(56) References Cited

U.S. PATENT DOCUMENTS

| 6,151,306 A * | 11/2000 | Ogasawara | B60L 3/12 |
| | | | 307/10.1 |
| 2007/0028134 A1* | 2/2007 | Gammel | H04L 1/0045 |
| | | | 714/4.1 |
| 2007/0061670 A1* | 3/2007 | Shih | H04L 1/0061 |
| | | | 714/758 |

FOREIGN PATENT DOCUMENTS

| JP | H11-284605 A | 10/1999 |
| JP | 2016-012761 A | 1/2016 |

* cited by examiner

*Primary Examiner* — Samir W Rizk
(74) *Attorney, Agent, or Firm* — McDermott Will & Emery LLP

(57) ABSTRACT

An object of the present invention is to increase speed of retransmission. A communication device has a transmission unit, a reception unit, a comparison unit, and a retransmission control unit. The transmission unit transmits first data toward a communication party. The reception unit receives second data as the first data received and returned by the communication party. The comparison unit is a process unit in a data link layer and compares the transmitted first data with the received second data. The retransmission control unit is a process unit in the data link layer and, when the transmission first data and the received second data do not match as a result of the comparison by the comparison unit, controls retransmission of the first data.

10 Claims, 13 Drawing Sheets

COMMUNICATION DEVICE AND RETRANSMISSION CONTROL METHOD

CROSS-REFERENCE TO RELATED APPLICATIONS

The disclosure of Japanese Patent Application No. 2016-162755 filed on Aug. 23, 2016 including the specification, drawings and abstract is incorporated herein by reference in its entirety.

BACKGROUND

The present invention relates to a communication device and a retransmission control method.

An example of techniques of increasing reliability of communication is a technique of detecting a communication error disclosed in patent literature 1.

Another technique of increasing reliability of communication is, for example, retransmission control of data transmitted from a transmission-side device to a reception-side device, which is disclosed in patent literature 2. In the patent literature 2, a reading device as a transmission-side device transmits image data to a control device as a reception-side device and, when software of a higher-level layer detects an error in the received image data, the reception-side device requests the transmission-side device to retransmit it.

RELATED ART LITERATURE

Patent Literature

Patent Literature 1: Japanese Unexamined Patent Application Publication No. Hei 11(1999)-284605
Patent Literature 2: Japanese Unexamined Patent Application Publication No. 2016-12761

SUMMARY

A communication amount is increasing in a network mounted on a car. With the increase, introduction of a full-duplex communication network (a communication network of a duplex communication system) such as Ethernet (registered trademark) as an in-vehicle network is being examined. The in-vehicle network is requested, particularly, to achieve higher reliability and lower delay of communication.

In view of the requests on higher reliability and lower delay of communication, the inventors of the present invention found out the following problems.

Even when the retransmission technique disclosed in the patent literature 2 is applied to a full-duplex communication network (that is, a communication network of the duplex communication system), since the process speed by software of a higher-level layer is slow, long time is required since a transmission-side device transmits data until a retransmission request from a reception-side device is received. As a result, there is the possibility that retransmission delays.

The precondition of the technique disclosed in the patent literature 1 is communication of near distance and low speed so that a transmission-side device can supply a clock to a reception-side device. The precondition of the technique disclosed in Patent Literature 1 is that a signal line in which transmission data is transmitted and a signal line in which return data is transmitted are provided independently of each other. It is consequently difficult to apply the technique disclosed in the patent literature 1 as it is to a full-duplex communication network (that is, a communication network of a duplex communication system).

The other problems and novel features will become apparent from the description of the specification and the appended drawings.

According to an embodiment, a communication device receives data which is transmission data sent by itself, received by a communication party, and sent back by the communication party and, when a mismatch is detected between the reception data and the transmission data in a data link layer, controls retransmission of the transmission data.

According to the embodiment, the speed of retransmission can be increased.

DETAILED DESCRIPTION

Figure 1:
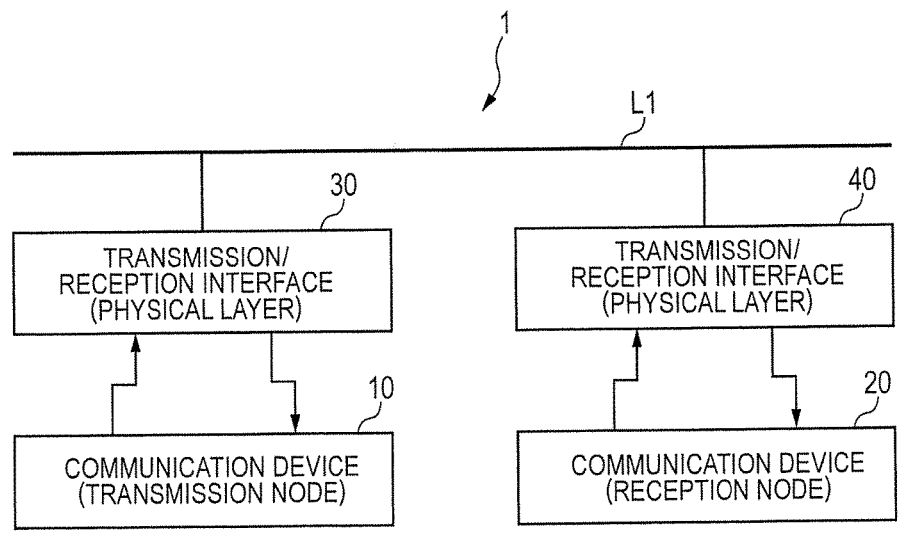
FIG. 1 is a block diagram illustrating outline of a communication system of a first embodiment.

Hereinafter, embodiments will be described with reference to the drawings. The same reference numerals are designated to the same members and repetitive description will not be given.

First Embodiment

Outline of Communication System
FIG. 1 is a block diagram illustrating outline of a communication system of a first embodiment. In FIG. 1, a communication system 1 has communication devices 10 and 20, transmission/reception interfaces 30 and 40, and a network line L1.

The communication device 10 transmits transmission data (hereinbelow, also called "first data") toward the communication device 20 as a communication party. That is, the communication device 10 operates as a "transmission node". The first data transmitted from the communication device 10 reaches the communication device 20 via the transmission/reception interface 30, the network line L1, and the transmission/reception interface 40. In this case, the communication devices 10 and 20, the transmission/reception interfaces 30 and 40, and the network line L1 may construct a full-duplex communication network (that is, a network of the duplex communication system). Hereinbelow, description will be given on assumption that a full-duplex communication network (that is, a network of the duplex communication system) is constructed.

The communication device 20 receives the first data (that is, transmission data) transmitted from the communication device 10. That is, in this case, the communication device 20 operates as a "reception node". The communication device 20 returns the received first data toward the communication device 10. For example, the communication device 20 "mirror-returns" the received first data as it is.

The receiving and returning processes of the first data in the communication device 20 are performed, for example, in a data link layer, not a higher-level layer such as a network layer. It can avoid processes in a higher-level layer in which process speed is slow.

The communication device 10 receives the first data (that is, return data) returned from the communication device 20 by the duplex communication system. In the following, the received return data is also called "second data". The communication device 10 compares the received second data and the transmitted first data and, when both of the data do not match, executes retransmission of the first data. The case where both of the data match means that the first data transmitted from the communication device 10 is properly received by the communication device 20, so that the communication device 10 can delete the first data temporarily held.

The process of receiving the second data, the process of comparing the first data and the second data, and the process of retransmitting the first data by the communication device 10 are performed, for example, in the data link layer, not a higher-level layer such as a network layer. It can avoid processes in the higher-level layer in which the process speed is slow.

As described above, the communication device 10 in the communication system 1 receives return data which is transmission data of itself and returned by the process in the data link layer from the communication device 20 and, when a mismatch between the received return data and the transmission data is detected in the data link layer, controls retransmission of the transmission data. By the above, the retransmission control can be performed in the data link layer, not in a higher-level layer in which process speed is slow, increase in the speed of retransmission can be realized. Further, execution of an error check process in the communication device 20 as a reception node can be avoided, so that the process load of the reception node can be lessened.

Configuration Example of Transmission Node

Figure 2:
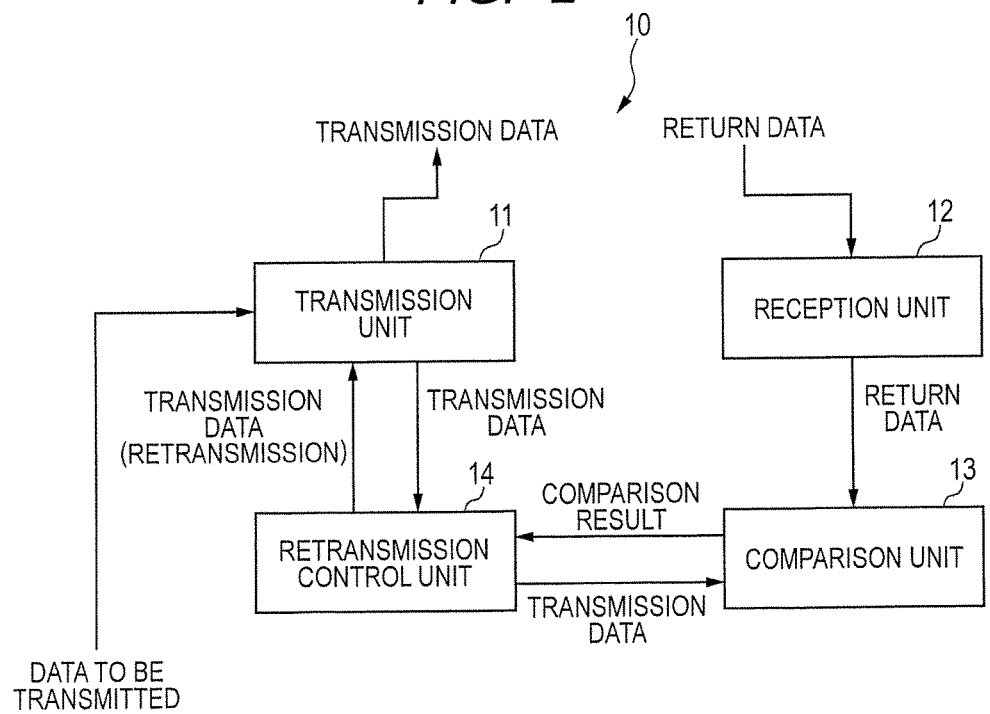
FIG. 2 is a block diagram illustrating an example of a transmission node of the first embodiment.

FIG. 2 is a block diagram illustrating an example of a transmission node of the first embodiment. Since the precondition is that the communication device 10 operates as a transmission node as described above, the configuration of the communication device 10 will be described.

In FIG. 2, the communication device 10 has a transmission unit 11, a reception unit 12, a comparison unit 13, and a retransmission control unit 14. Each of the transmission unit 11, the reception unit 12, the comparison unit 13, and the retransmission control unit 14 is a process unit in the data link layer. The transmission unit 11, the reception unit 12, the comparison unit 13, and the retransmission control unit 14 are constructed by hardware.

The transmission unit 11 receives data to be transmitted (that is, the first data) which is output from a higher-level layer, and outputs the received data to be transmitted as transmission data to the transmission/reception interface 30 and the retransmission control unit 14. By the operation, the transmission data is transmitted toward a reception node as a communication party and temporarily held in preparation for retransmission by the retransmission control unit 14.

The reception unit 12 receives return data (that is, the second data) as data which is the first data returned by the reception node and outputs the received return data to the comparison unit 13.

The comparison unit 13 compares the transmission data (that is, the first data) held in the retransmission control unit 14 and the return data (that is, the second data) received from the reception unit 12 and outputs a comparison result to the retransmission control unit 14. In the case where each of the transmission data and the return data is a bit sequence made of a plurality of bits, if even one bit in the bit sequence does not match, it can be determined that the transmission data and the return data do not match.

The retransmission control unit 14 temporarily holds the transmission data received from the transmission unit 11. When the comparison result received from the comparison unit 13 indicates a mismatch between the transmission data and the return data, the retransmission control unit 14 retransmits the held transmission data to the reception node. On the other hand, when the comparison result received from the comparison unit 13 indicates a match between the transmission data and the return data, the retransmission control unit 14 eliminates the temporarily held transmission data.

Configuration Example of Reception Node

Figure 3:
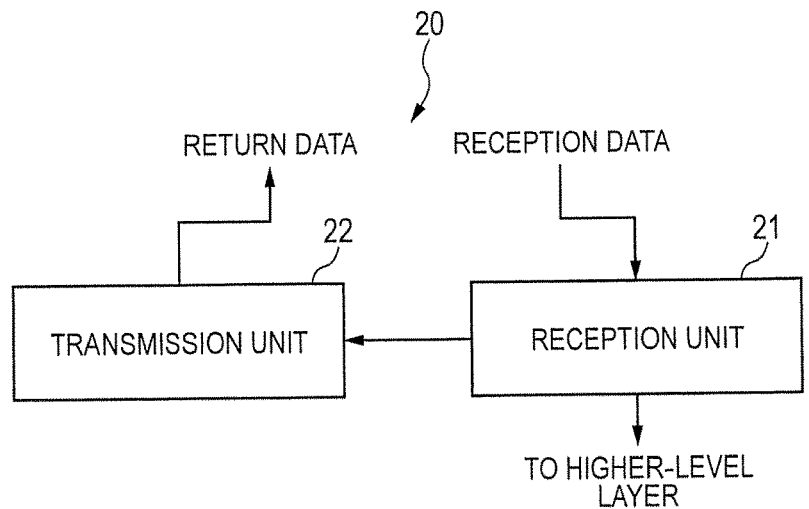
FIG. 3 is a block diagram illustrating an example of a reception node of the first embodiment.

FIG. 3 is a block diagram illustrating an example of a reception node of the first embodiment. As described above, in this case, the precondition is that the communication device 20 operates as a reception node, so that the configuration of the communication device 20 will be described.

In FIG. 3, the communication device 20 has a reception unit 21 and a transmission unit 22. Each of the reception unit 21 and the transmission unit 22 is a process unit in the data link layer. Both the reception unit 21 and the transmission unit 22 are constructed by hardware.

The reception unit 21 receives data (that is, the first data) transmitted from the communication device 10 as a transmission node. The reception unit 21 temporarily holds the received first data and outputs it as return data to the transmission unit 22. The temporarily holding process and the output process of return data by the reception unit 21 are executed each time retransmission data of the first data is received by the reception unit 21 until a "reception success determination condition" of the first data is satisfied. When the "reception success determination condition" of the first data is satisfied, the reception unit 21 outputs the temporarily held first data to a layer higher than the data link layer. The "reception success determination condition" is that, for example, retransmission data corresponding to return data is not received within a predetermined period since the communication device 20 returns the data. Specifically, when a timing at which the communication device 20 returns data is set as a reference and the communication device 20 receives retransmission data corresponding to the return data within predetermined time from the reference timing, the "reception success determination condition" is not satisfied. On the other hand, when the communication device 20 does not receive the retransmission data corresponding to the return data within the predetermined time from the reference timing, the "reception success determination condition" is satisfied.

The transmission unit 22 transmits the return data received from the reception unit 21 toward the communication device 10 as a transmission node. As described above, the reception unit 21 and the transmission unit 22 are process units in the data link layer. Specifically, the process of returning the return data is performed in the data link layer in the communication device 20 as a reception node. Only after the "reception success determination condition" is satisfied, reception data is passed to a layer higher than the data link layer.

Operation Example of Communication System

Figure 4:
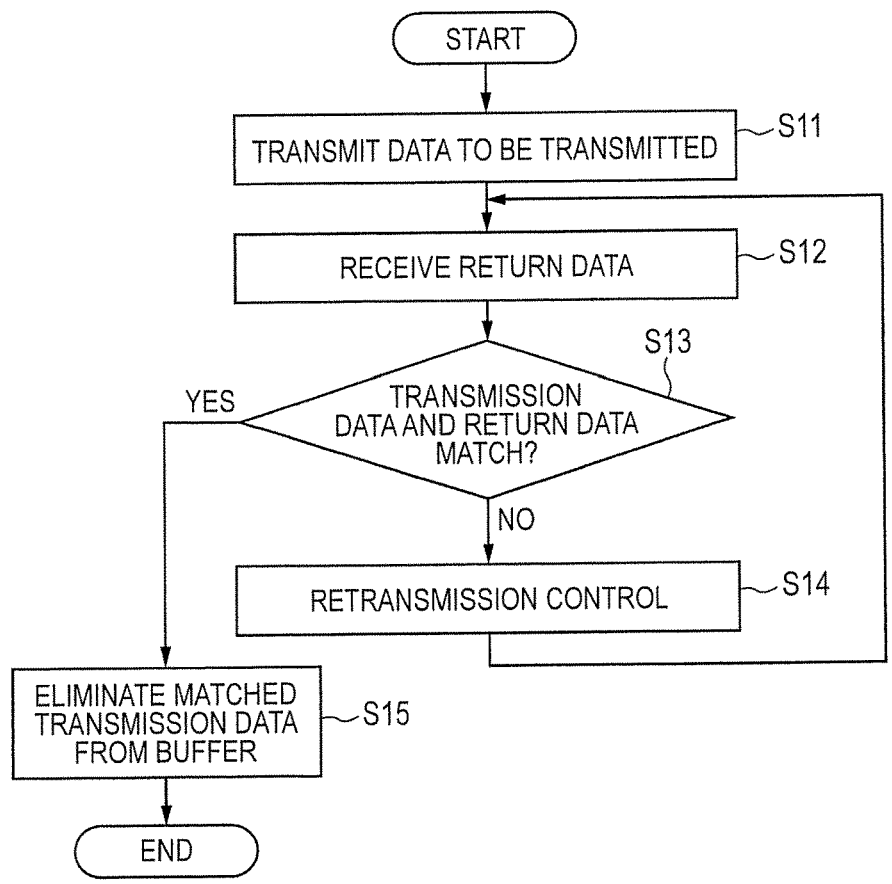
FIG. 4 is a flowchart illustrating an operation example of the transmission node of the first embodiment.
Figure 5:
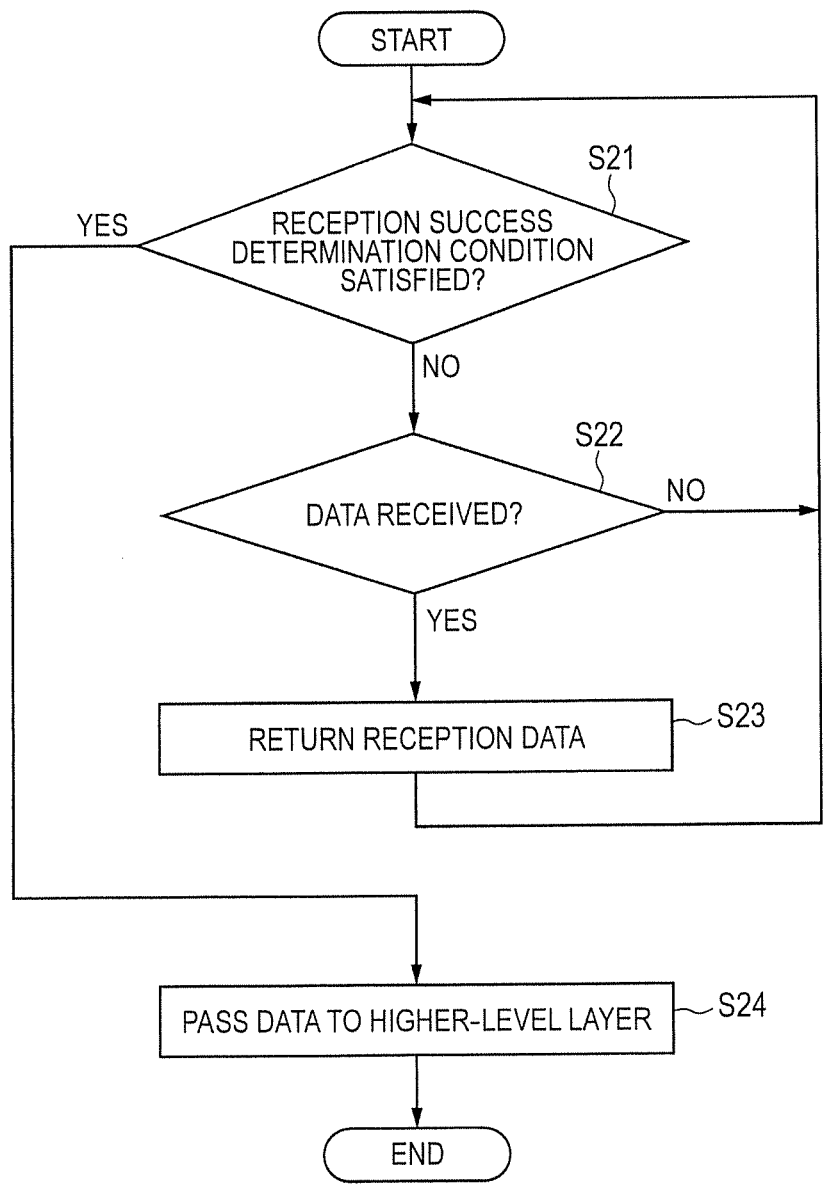
FIG. 5 is a flowchart illustrating an operation example of the reception node of the first embodiment.

An operation example of the communication system 1 having the above-described configuration will be described. FIG. 4 is a flowchart illustrating an operation example of the transmission node of the first embodiment. FIG. 5 is a flowchart illustrating an operation example of the reception node of the first embodiment.

Operation Example of Transmission Node

Processes illustrated in the flowchart of FIG. 4 start, for example, at the time point when the transmission unit 11 receives data to be transmitted from a layer higher than the data link layer.

First, the transmission unit 11 of the communication device 10 as a transmission node transmits data to be transmitted (that is, the first data) toward the communication device 20 as a reception node (step S11). As described above, the data to be transmitted is received by the communication device 20 and, after that, returned as return data. The data to be transmitted is passed from the transmission unit 11 to the retransmission control unit 14 and temporarily held in the retransmission control unit 14.

Next, the reception unit 12 receives the return data transmitted from the communication device 20 (step S12).

The comparison unit 13 compares the data to be transmitted (that is, the first data) held in the retransmission control unit 14 with the return data (that is, the second data) received by the reception unit 12 and determines whether the data matches or not (step S13).

When the data to be transmitted and the return data does not match (NO in step S13), the retransmission control unit 14 controls retransmission of the data to be transmitted which is held (step S14). Specifically, the retransmission control unit 14 transmits the data to be transmitted which is held toward the reception node via the transmission unit 11. At this time, the data to be transmitted is continuously held in the retransmission control unit 14 in preparation for retransmission of the next time, executed when the data to be transmitted which is retransmitted this time does not match return data corresponding to the retransmission data.

When the data to be transmitted and the return data matches (YES in step S13), the retransmission control unit 14 can estimate that the data to be transmitted was properly received by the reception node and therefore eliminates the held data to be transmitted from a buffer (not illustrated) (step S15).

Operation Example of Reception Node

In FIG. 5, first, the reception unit 21 of the communication device 20 as a reception node determines whether the "reception success determination condition" is satisfied or not (step S21). Since the "reception success determination condition" is not satisfied for the first time, the flow advances to step S22.

Next, the reception unit 21 determines whether data is received or not (step S22). When data to be transmitted is not transmitted yet from the transmission node, the reception unit 21 does not receive data transmitted from the transmission node, so that the flow returns to step S21. As a result, the steps S21 and S22 are repeated.

On the other hand, when data is received (YES in step S22), the reception unit 21 passes the reception data as return data to the transmission unit 22, and the transmission unit 22 returns the return data toward the transmission node (step S23). At this time, the reception unit 21 temporarily holds the return data. The flow returns to step S21.

When the reception unit 21 sets, for example, a timing at which the transmission unit 22 returns return data as a reference and the reception unit 21 does not receive retransmission data corresponding to the return data within predetermined time from the reference timing, the reception unit 21 determines that the "reception success determination condition" is satisfied (YES in step S21). The reception unit 21 passes the return data held in the reception unit 21 toward a layer higher than the data link layer (step S24).

On the other hand, when it is determined that the "reception success determination condition" is not satisfied yet (NO in step S21), the reception unit 21 determines whether retransmission data retransmitted from the transmission node is received or not (step S22).

As described above, according to the first embodiment, in the communication device 10 as the transmission node, the comparison unit 13 compares first data transmitted from the transmission unit 11 and second data which is the first data received by the reception node, returned from the reception node, and received by the reception unit 12. When the first data transmitted from the transmission unit 11 and the second data received by the reception unit 12 does not match as a result of the comparison by the comparison unit 13, the retransmission control unit 14 controls retransmission of the first data. The comparison unit 13 and the retransmission control unit 14 are process units in the data link layer.

With the configuration of the communication device 10, retransmission control can be performed in the data link layer, not in a higher-level layer in which process speed is slow. Consequently, higher speed of retransmission can be realized. In addition, execution of an error check process in the reception node can be avoided, so that the process load on the reception node can be lessened.

In the communication device 20 as a reception node, the reception unit 21 receives data transmitted from a transmission node. The transmission unit 22 returns the data received by the reception unit 21 toward the transmission node. The reception unit 21 and the transmission unit 22 are process units in the data link layer.

With the configuration of the communication device 20, returning process is executed in the data link layer, not in a higher-level layer in which process speed is slow. Consequently, data can be returned at high speed. As a result, it can contribute to higher speed of retransmission.

In the communication device 20, the reception unit 21 passes reception data to a layer higher than the data link layer only after the "reception success determination condition" is satisfied. The "reception success determination condition" is that, as described above, for example, retransmission data corresponding to return data is not received within a predetermined period since the communication device 20 returns data.

With the configuration of the communication device 20, it can avoid that a higher-level layer performs a useless process in a state where the "reception success determination condition" is not satisfied. As a result, the process load on the reception node can be lessened.

Although the configuration of the communication device 20 that the reception unit 21 passes reception data to a layer higher than the data link layer only after the "reception success determination condition" is satisfied has been described above, the configuration of the communication device 20 is not limited to the above. For example, the configuration of the communication device 20 may be a configuration that the reception unit 21 passes reception data to a higher-level layer even in a state where the "reception success determination condition" is not satisfied, and the higher-level layer starts a process of the reception data only after the "reception success determination condition" is satisfied. Also by the configuration, it can avoid that a higher-level layer performs a useless process in a state where the "reception success determination condition" is not satisfied. As a result, the process load on the reception unit can be lessened.

Second Embodiment

A second embodiment relates to an example of a concrete configuration of a transmission node and a reception node described in the first embodiment. Since the basic configuration of the transmission node and the reception node of the second embodiment is the same as that of the communication devices 10 and 20 of the first embodiment, FIGS. 1 to 3 can be referred to with respect to the configuration of a communication system of the second embodiment and the basic configuration of the transmission node and the reception node of the second embodiment.

Configuration Example of Transmission Node

Figure 6:
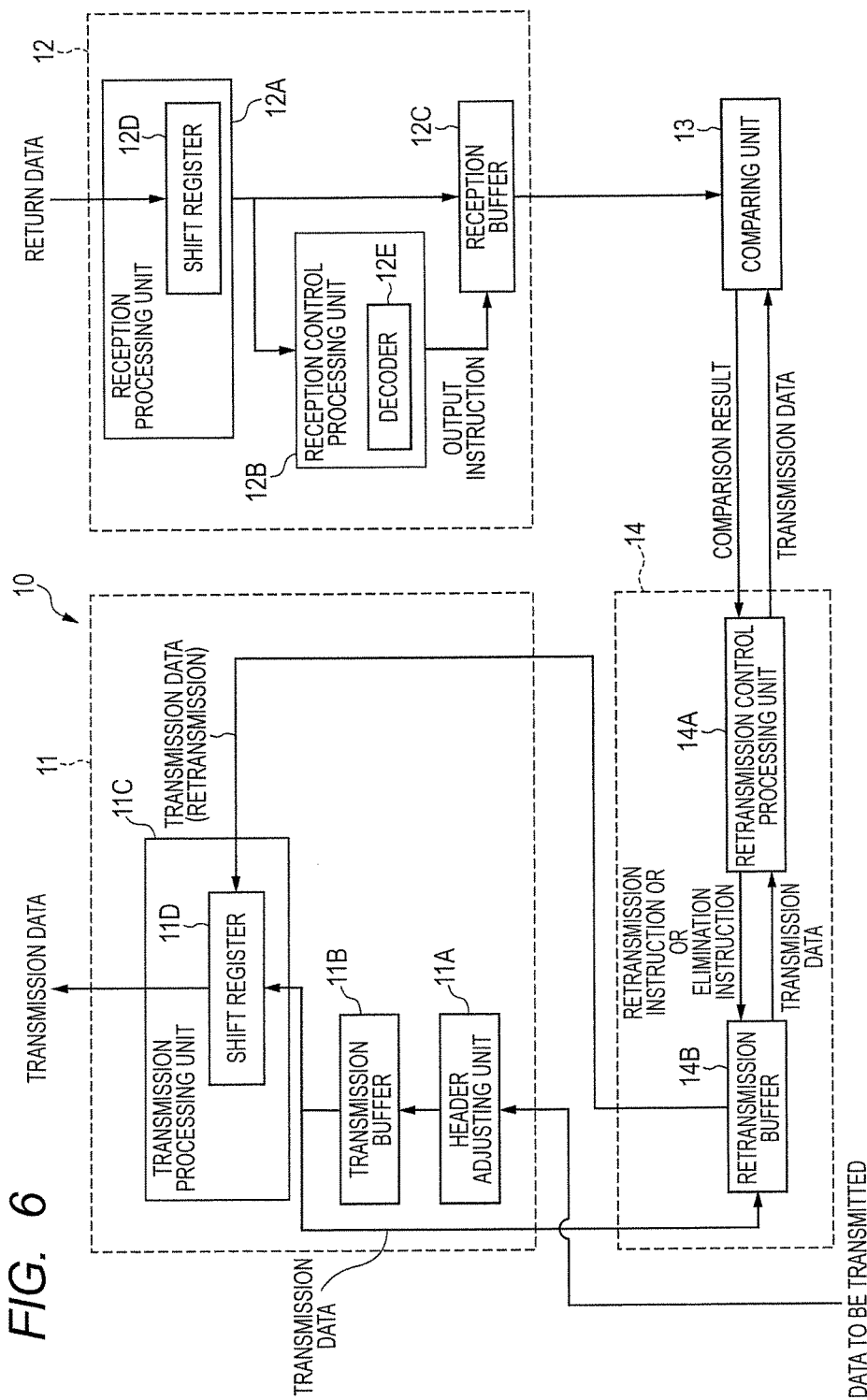
FIG. 6 is a block diagram illustrating an example of a concrete configuration of a transmission node of a second embodiment.

FIG. 6 is a block diagram illustrating an example of a concrete configuration of the transmission node of the second embodiment. In FIG. 6, the transmission unit 11 of the communication device 10 of the second embodiment has a header adjusting unit 11A, a transmission buffer 11B, and a transmission processing unit 11C. The transmission processing unit 11C has a shift register 11D.

The header adjusting unit 11A receives data to be transmitted (that is, the first data) output from a higher-level layer. The header adjusting unit 11A makes a "mirror return request" included in a header added to the received data to be transmitted. The header adjusting unit 11A outputs the data to be transmitted to which the header including the "mirror return request" is added to the transmission buffer 11B.

Figure 7:
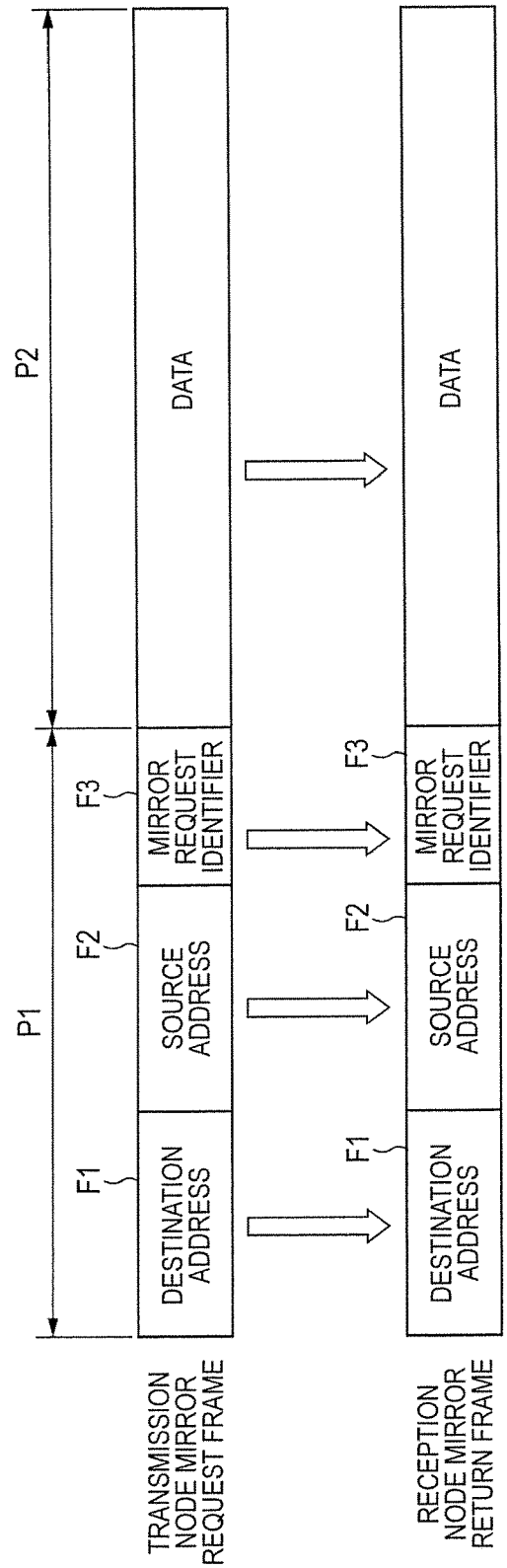
FIG. 7 is a diagram illustrating an example of a frame format of the second embodiment.

More concretely, the header and the data to be transmitted are transmitted, for example, in the form of a frame as illustrated in FIG. 7. FIG. 7 is a diagram illustrating an example of a frame format. In the upper part of FIG. 7, the format of a frame transmitted from the communication device 10 is illustrated. In the following, the frame transmitted from the communication device 10 as a transmission node is also called a "mirror request frame". The mirror request frame includes a header part P1 of a data link layer and a data part P2. The header part P1 includes a destination address field F1, a source address field F2, and a type field F3. In the frame transmitted from the communication device 10, the address of the communication device 20 as the reception node is stored in the destination address field F1, the address of the communication address 10 as the transmission node is stored in the source address field F2, and a "mirror request identifier (that is, mirror return request)" is stored in the type field F3. The "mirror request identifier" is information for requesting the reception node to return the received data as it is. As the addresses of the communication devices 10 and 20, MAC (Media Access Control) addresses of the communication devices 10 and 20 may be used, respectively.

Referring again to FIG. 6, the transmission buffer 11B receives the data to be transmitted to which the header including the "mirror return request" is added and outputs the received data to be transmitted to the transmission processing unit 11C and the retransmission control unit 14. For example, in the case of receiving a plurality of pieces of data to be transmitted, the transmission buffer 11B outputs the data to be transmitted in a first-in first-out manner.

In the transmission processing unit 11C, the shift register 11D receives the data to be transmitted from the transmission buffer 11B and sequentially outputs the received data to be transmitted to the transmission/reception interface 30. The shift register 11D receives retransmission data from the retransmission control unit 14 and sequentially outputs the received retransmission data to the transmission/reception interface 30.

The reception unit 12 has a reception processing unit 12A, a reception control processing unit 12B, and a reception buffer 12C. The reception processing unit 12A has a shift register 12D. The reception control processing unit 12B has a decoder 12E.

In the reception processing unit 12A, the shift register 12D receives return data via the transmission/reception interface 30 and sequentially outputs the received return data to the reception control processing unit 12B and the reception buffer 12C. The return data is temporarily held in the reception buffer 12C. To the return data, the header is added. In the reception buffer 12C, the return data to which the header is added may be temporarily held.

In the reception control processing unit 12B, the decoder 12E decodes the header added to the return data without decoding the return data. When the decoded header indicates that it is added to the return data corresponding to the transmission data of the communication device 10 itself and returned, the reception control processing unit 12B outputs, to the reception buffer 12C, an output instruction for outputting the return data held in the reception buffer 12C to the comparison unit 13.

As will be described later, the communication device 20 as the reception node of the second embodiment returns not only the received data (that is, the received first data) but also the header in the received state. For example, the header and the return data transmitted from the communication device 20 are transmitted in the form of the frame as illustrated in the lower part of FIG. 7. In the following, the frame returned from the communication device 20 as a reception node is also called a "mirror return frame". Specifically, as illustrated in the lower part of FIG. 7, in the destination address field F1, the source address field F2, and the type field F3 of the header part P1 of the mirror return frame, the same data as that in the mirror request frame, that is, the address of the communication device 20, the address of the communication address 10, and the mirror request identifier are stored, respectively.

When the address of the communication device 20, the address of the communication device 10, and the mirror request identifier are stored in the destination address field F1, the source address field F2, and the type field F3 of the received frame, respectively, the reception control processing unit 12B determines that the frame is a mirror return frame to the communication device 10 itself. In other words, when a frame including a header having the same data as that of the header of the mirror request frame transmitted from the transmission unit 11 is received, the reception control processing unit 12B determines that the received frame is a mirror return frame to the communication device 10 itself. That is, when the address of the communication device 20, the address of the communication device 10, and the mirror request identifier are stored in the destination address field F1, the source address field F2, and the type field F3 of the received frame, respectively, the header indicates that the header is added to the return data corresponding to the transmission data of the communication device 10 itself and the resultant data is returned.

Referring again to FIG. 6, the retransmission control unit 14 has a retransmission control processing unit 14A and a retransmission buffer 14B.

The retransmission control processing unit 14A passes transmission data temporarily held in the retransmission buffer 14B to the comparison unit 13 and receives a result of comparison between the transmission data and the return data by the comparison unit 13. When the comparison result received from the comparison unit 13 indicates a mismatch between the transmission data and the return data, the retransmission control processing unit 14A outputs a "retransmission instruction" to the retransmission buffer 14B. On the other hand, when the comparison result indicates a match between the transmission data and the return data, the retransmission control processing unit 14A outputs a "delete output" to the retransmission buffer 14B.

The retransmission buffer 14B temporarily holds the transmission data to which the header including the "mirror return request" is added, received from the transmission buffer 11B. That is, for example, the retransmission buffer 14B temporarily holds a mirror request frame as illustrated in the upper part of FIG. 7. When a "retransmission instruction" is received from the retransmission control processing unit 14A, the retransmission buffer 143 outputs the held transmission data with the header as retransmission data to the transmission processing unit 11C. When a "delete instruction" is received from the retransmission control processing unit 14A, the retransmission buffer 14B deletes the held transmission data with the header.

Configuration Example of Reception Node

Figure 8:
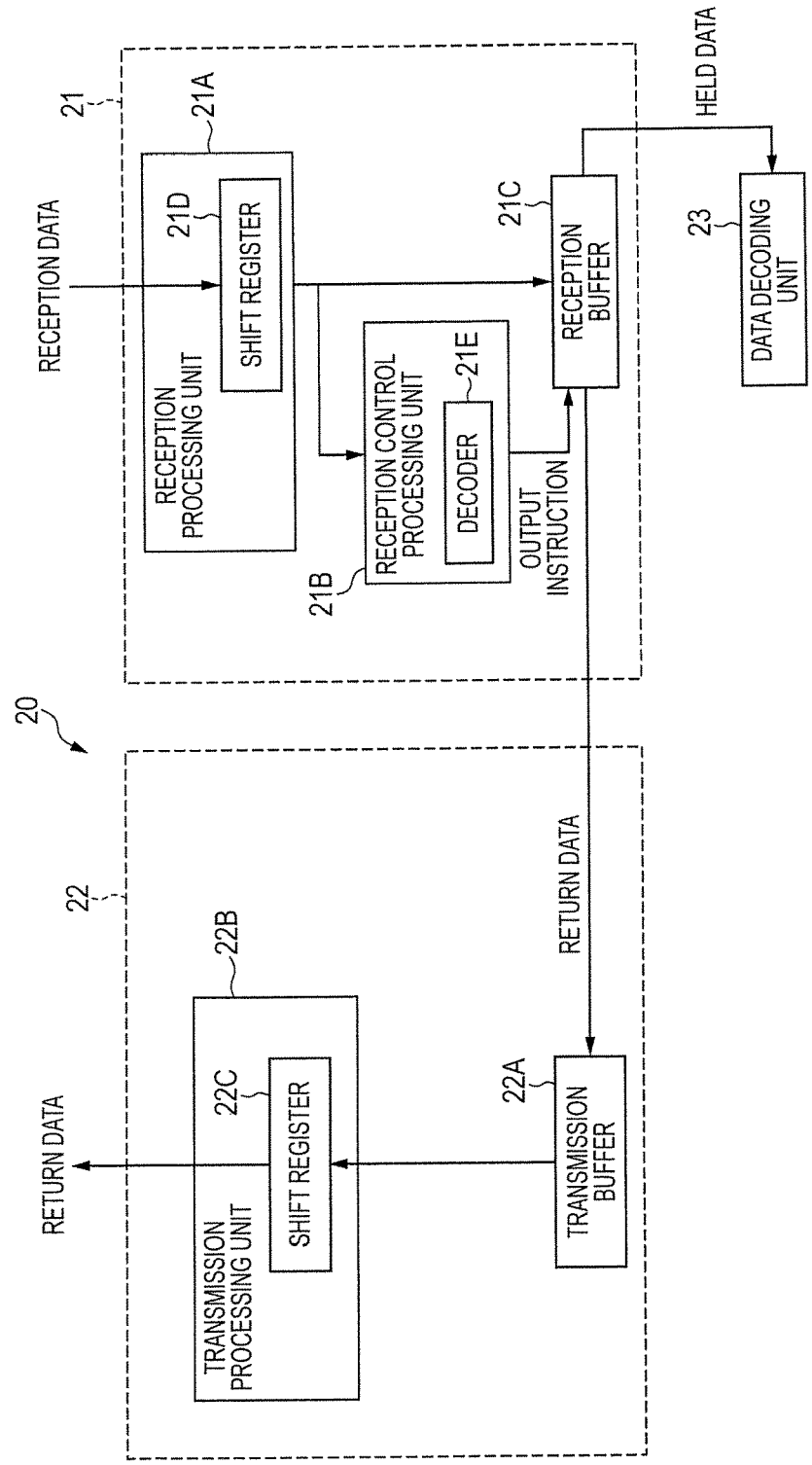
FIG. 8 is a block diagram illustrating an example of a concrete configuration of a reception node of the second embodiment.

FIG. 8 is a block diagram illustrating an example of a concrete configuration of a reception node of the second embodiment. In FIG. 8, the communication device 20 of the second embodiment has a data decoding unit 23 as a process unit corresponding to a layer higher than the data link layer. The reception unit 21 of the communication device 20 of the second embodiment has a reception processing unit 21A, a reception control processing unit 21B, and a reception buffer 21C. The reception processing unit 21A has a shift register 21D. The reception control processing unit 21B has a decoder 21E.

In the reception processing unit 21A, the shift register 21D receives data with a header including the "mirror return request" which is transmitted from the communication device 10 as the transmission node via the transmission/reception interface 40 and sequentially outputs the data to the reception control processing unit 21B and the reception buffer 21C. The reception data with the header including the "mirror return request" is temporarily held in the reception buffer 21C.

In the reception control processing unit 21B, the decoder 21E decodes the header added to the data part without decoding the data part received from the reception processing unit 21A. When the "mirror return request" is included in the decoded header, the reception control processing unit 21B outputs an output instruction for making the reception buffer 21C output the held data with the header to the transmitting unit 22 to the reception buffer 21C. By the operation, the data with the header held in the reception buffer 21C is returned as return data toward the transmission node.

The reception control processing unit 21B determines whether the "reception success determination condition" is satisfied or not. When the "reception success determination condition" is satisfied, the reception control processing unit 21B outputs the data with the header held in the reception buffer 21C to a layer higher than the data link layer and deletes the held data with the header. In this case, the data decoding unit 23 corresponds to the higher-level layer.

When the data with the header is received from the reception buffer 21C, the data decoding unit 23 decodes the data and outputs the decoded data to a function unit (not illustrated) at the post stage using the data.

The transmission unit 22 has a transmission buffer 22A and a transmission processing unit 22B. The transmission processing unit 22B has a shift register 22C.

The transmission buffer 22A outputs the input return data with the header to the transmission processing unit 22B. The return data with the header supplied to the transmission buffer 22A is output from the reception buffer 21C. In other words, the return data with the header is in a state where not only the data received by the reception processing unit 21A but also the header are received. That is, the transmission buffer 22A receives, for example, a mirror return frame as illustrated in the lower part of FIG. 7 from the reception buffer 21C and outputs it to the transmission processing unit 22B.

In the transmission processing unit 22B, the shift register 22C receives return data with a header received from the transmission buffer 22A (for example, the mirror return frame) and sequentially outputs it to the transmission/reception interface 40.

Operation Example of Communication System

An operation example of the communication system 1 of the second embodiment having the above configuration will be described.

Operation Example of Transmission Node

Since a main stream of the operation flow of the communication device 10 as the transmission node of the second embodiment is not so different from that of the transmission node of the first embodiment, different points will be mainly descried by using FIG. 4.

In step S11, the transmission unit 11 of the communication device 10 of the second embodiment transmits transmission data with a header including the "mirror return request" toward the reception node. That is, the transmission unit 11 transmits, for example, the above-described mirror request frame toward the reception node.

In step S12, when data to which a header having the same data as that of the header attached to the transmission data transmitted from the transmission unit 11 is attached is received via the transmission/reception interface 30, the reception unit 12 determines that the data is return data. That is, for example, when a frame including a header having the same data as that of the header of the mirror request frame transmitted from the transmission unit 11 is received, the reception unit 12 determines that the reception frame is a mirror return request frame to the communication device 10 itself.

Operation Example of Reception Node

Since a main stream of the operation flow of the communication device 20 as the reception node of the second embodiment is not so different from that of the reception node of the first embodiment, different points will be mainly descried by using FIG. 5.

In step S22, whether the reception unit 21 of the communication device 20 of the second embodiment receives data to which a header including the "mirror return request" is added or not is determined. In step S23, the transmission unit 22 transmits data received in a state where the header including the "mirror return request" is added toward the transmission node.

As described above, according to the second embodiment, in the communication device 10 as the transmission node, the transmission unit 11 transmits data to be transmitted to which a header including the "mirror request identifier (that is, mirror return identifier)" is added toward the reception node. The "mirror request identifier" is information for requesting the reception node to return the received data as it is as described above.

With the configuration of the communication device 10, a mirror return can be requested to the reception node easily by a process in the data link process. With the configuration of the communication device 10, the reception node can determine whether the data is data to be mirror-returned or not by decoding only the header. As a result, it can contribute to increase the speed of retransmission.

The header added to the transmission data transmitted from the transmission unit 11 includes the destination address field, the source address field, and the type field. The transmission unit 11 maps the mirror request identifier to the type field.

With the configuration of the communication device 10, the frame configuration used in a full-duplex communication network such as the Ethernet (registered trademark) can be used. Therefore, the communication device which can be widely applied to the full-duplex communication network can be realized.

When the address of the reception node, the address of the communication device 10 itself, and the mirror request identifier are stored in the destination address field, the transmission source address field, and the type field, respectively, of the header added to the reception data, the reception unit 12 determines that the data is return data to the communication device 10 itself.

With the configuration of the communication device 10, in the reception node, not only reception data but also the header can be returned as it is. Consequently, the process load on the reception node can be reduced.

In the communication device 20 as the reception node, when the mirror request identifier is included in the header added to the data received by the reception unit 12, the transmission unit 11 returns the data toward the transmission node.

With the configuration of the communication device 20, whether the data is data to be mirror-returned or not can be determined by decoding only the header, so that the data can be mirror-returned easily by the process in the data link layer. As a result, it can contribute to increase in the speed of retransmission.

The reception unit 21 includes the reception buffer 21C holding reception data and the reception control processing unit 21B decoding a header added to the reception data and determining whether the mirror request identifier is included in the header or not. When the mirror request identifier is included in the header, the reception control processing unit 21B makes the reception buffer 21C output the held data to the transmission unit 11, thereby making the transmission unit 11 return the held data toward the transmission node. When the "reception success determination condition" is satisfied after return of the held data by the transmission unit 11, the reception control processing unit 21B makes the reception buffer 21C output the held data to the data decoding unit 23.

With the configuration of the communication device 20, until the "reception success determination condition" is satisfied, only the header is decoded and the data is not decoded. Only after the "reception success determination condition" is satisfied, the data can be decoded. Therefore, the process load can be lessened as compared with the case of decoding data each time.

Modification

The above description is on condition that the communication device 10 as the transmission node makes the "mirror request identifier (that is, mirror return request)" included in a header added to transmission data. However, the configuration of the communication device 10 is not limited to the above, and the "mirror request identifier (that is, the mirror return request)" may not be included in the header added to the transmission data. In this case, the header adjusting unit 11A may not be provided for the communication device 10, and data to be transmitted may be input to the transmission buffer 11B. In this case, in the communication device 20 as the reception node, the header is decoded by the reception control processing unit 21B. When the address of the communication device 20 is stored in the destination address field, the reception control processing unit 21B makes the reception buffer 21C output the held data to the transmission unit 11.

Third Embodiment

A third embodiment relates to another example of the transmission and reception nodes described in the first embodiment. As the basic configuration of the transmission and reception nodes of the third embodiment is similar to that of the communication devices 10 and 20 of the first embodiment, the first to third diagrams in FIG. 1 to FIG. 3 can be referred to with reference to the configuration of the communication system of the third embodiment and the basic configuration of the transmission and reception nodes of the third embodiment.

Configuration Example of Transmission Node

Figure 9:
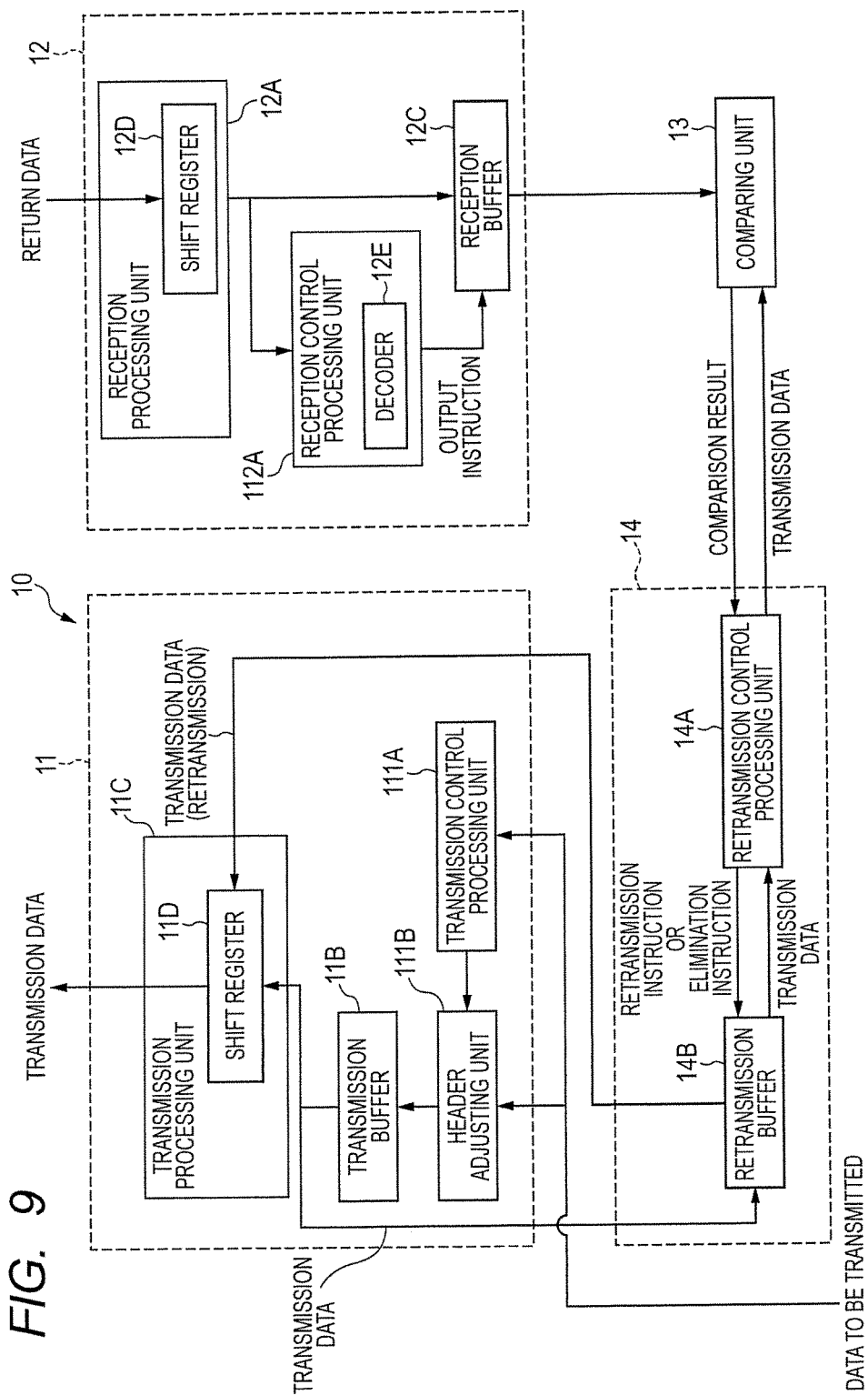
FIG. 9 is a block diagram illustrating an example of a concrete configuration of a transmission node of a third embodiment.

FIG. 9 is a block diagram illustrating an example of a concrete configuration of a transmission node of a third embodiment. The same reference numerals are designated to the components of the transmission node of the second embodiment and equivalent components of the transmission node of the third embodiment, and repetitive description is omitted.

In FIG. 9, the transmission unit 11 of the communication device 10 of the third embodiment has a transmission control processing unit 111A and a header adjusting unit 111B.

Figure 10:
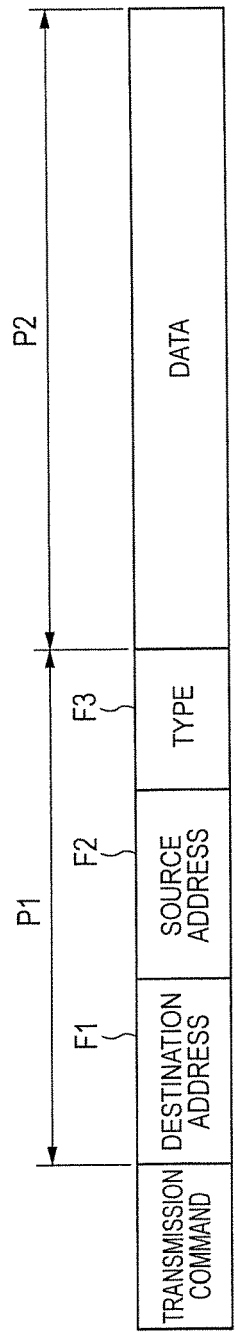
FIG. 10 is a diagram provided to explain a frame to be transmitted of the third embodiment.

The transmission control processing unit 111A receives data to be transmitted which is output from a higher-level layer. To the received data to be transmitted, a "transmission command" and a header are added. For example, as illustrated in FIG. 10, the transmission control processing unit 111A receives a "frame to be transmitted" in a state where the transmission command is added before the "frame to be transmitted". The "frame to be transmitted" includes, for example, the header part P1 and the data part P2 like the frame format illustrated in FIG. 7. The header part P1 includes the destination address field F1, the source address field F2, and the type field F3. In the data part P2, data to be transmitted is stored.

The "transmission command" is information indicating whether the data to be transmitted is data requested to be mirror-returned or not. For example, when the data to be transmitted is data requested to be mirror-returned, the bit value "1" may be added as the transmission command. When the data to be transmitted is not data requested to be mirror-returned, the bit value "0" may be added as the transmission command. Further, control data may be set as data requested to be mirror-returned and data other than the control data (for example, sound data, image data, and so on) may be set as data which is not requested to be mirror-returned.

According to the content of the received transmission command, the transmission control processing unit 111A controls execution/inexecution of header adjustment by the header adjusting unit 111B. For example, when the transmission command added to the received data to be transmitted indicates data requested to be mirror-returned, the transmission control processing unit 111A outputs a "header adjustment execution instruction for adjusting a header to a mirror-return request header" to the header adjusting unit 111B. On the other hand, when the transmission command added to the received data to be transmitted indicates data other than the data requested to be mirror-returned, the transmission control processing unit 111A outputs a "header adjustment inexecution instruction" to the header adjusting unit 111B.

In a manner similar to the transmission control processing unit 111A, the header adjusting unit 111B receives data to be transmitted to which the transmission command and the header are added, that is the frame to be transmitted to which the transmission command is added. When a "header adjustment execution instruction for adjusting the header to the header requested to be mirror-returned" is received from the transmission control processing unit 111A, the header adjusting unit 111B deletes the transmission command from the frame to be transmitted and stores a "mirror request identifier (that is, mirror-return request)" in the type field F3 in the header part P1 of the frame to be transmitted, thereby generating a "mirror request frame" illustrated in the upper part of FIG. 11. The header adjusting unit 111B outputs the "mirror request frame" to the transmission buffer 11B.

On the other hand, when the "header adjustment inexecution instruction" is received from the transmission control processing unit 111A, the header adjusting unit 111B does not perform the header adjustment but deletes the transmission command from the frame to be transmitted, thereby generating a "frame requesting no mirror-return". At this time, information other than the "mirror request identifier" is stored in the type field F3 in the header part P1. The header adjusting unit 111B outputs the "frame requesting no mirror-return" to the transmission buffer 11B.

The reception unit 12 has a reception control processing unit 112A. Like the reception control processing unit 12B of the second embodiment, the reception control processing unit 112A decodes the header added to the return data without decoding the return data. When the decoded header indicates that it is added to return data corresponding to transmission data of the communication device 10 itself and returned, the reception control processing unit 112A outputs the return data held in the reception buffer 12C to the comparison unit 13.

As will be described later, the communication device 20 as the reception node of the third embodiment returns received data as it is, on the other hand, regarding the header, replaces the data in the destination address field in the received header to the data in the source address field, and stores the "mirror return identifier" in the type field. For example, as illustrated in the lower part of FIG. 11, different from the mirror request frame, the address of the communication device 10, the address of the communication device 20, and the mirror return identifier are stored in the destination address field F1, the source address field F2, and the type field F3, respectively in the header part P1 of the mirror return frame.

When the address of the communication device 10, the address of the communication device 20, and the "mirror return identifier" are stored in the destination address field F1, the source address field F2, and the type field F3, respectively in the received frame, the reception control processing unit 112A determines that the frame is a mirror return frame to the communication device 10 itself. The "mirror return identifier" is information indicating that data transmitted together with the mirror return identifier is return data. Specifically, return data is stored in the data part P2 of the frame in which the "mirror return identifier" is stored in the type field F3.

Configuration Example of Reception Node

Figure 12:
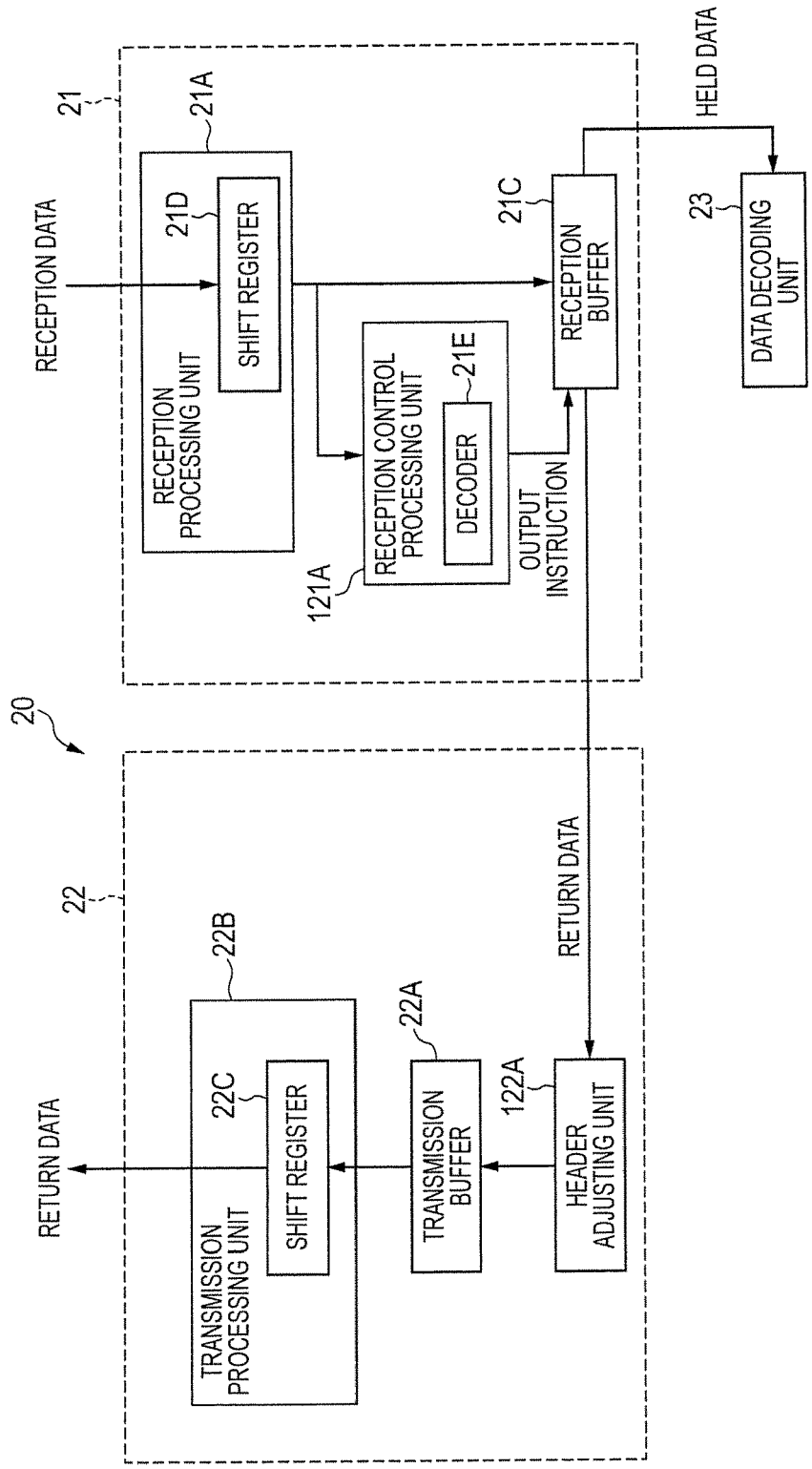
FIG. 12 is a block diagram illustrating an example of a concrete configuration of a reception node of the third embodiment.

FIG. 12 is a block diagram illustrating an example of a concrete configuration of a reception node of the third embodiment. The same reference numerals are designated to the components of the reception node of the third embodiment and equivalent components of the reception node of the third embodiment, and repetitive description is omitted.

In FIG. 12, the reception unit 21 of the communication device 20 of the third embodiment has a reception control processing unit 121A. The reception control processing unit 121A receives the reception data to which the header is added. For example, the reception control processing unit 121A receives the header and the reception data in a frame form. The reception control processing unit 121A decodes the header without decoding the data part of the reception part received from the reception processing unit 21A. The reception control processing unit 121A determines whether data included in the reception frame is data to be returned or not. When the "mirror request identifier" is included in the type field of the decoded header, the reception control processing unit 121A determines that the data included in the reception frame is data to be returned, and operates in a manner similar to the reception control processing unit 21B of the second embodiment. Specifically, the reception control processing unit 121A outputs an output instruction for outputting the reception frame held in the reception buffer 21C to the transmission unit 22 to the reception buffer 21C and determines whether the "reception success determination condition" is satisfied or not in a predetermined cycle. The operation of the reception control processing unit 121A in the case where the "reception success determination condition" is satisfied, the operation of the reception control processing unit 121A in the case where the "reception success determination condition" is not satisfied are the same.

On the contrary, when information other than the "mirror request identifier" is included in the type field of the decoded header, the reception control processing unit 121A outputs an output instruction for outputting the reception frame held in the reception buffer 21C to a layer higher than the data link layer to the reception buffer 21C and deletes the held reception frame. The reason is that the data of the reception frame is not data to be mirror-returned.

Figure 11:
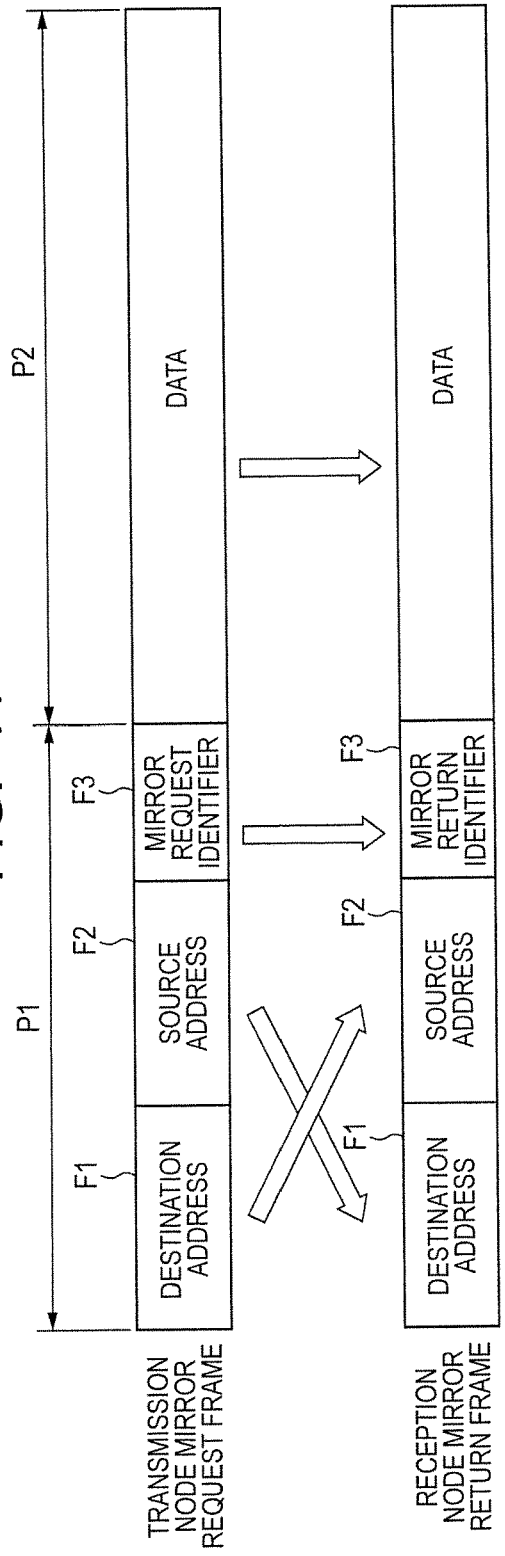
FIG. 11 is a diagram illustrating an example of a frame format of the third embodiment.

The reception buffer 21C holds, for example, a reception frame (specifically, the header and data) as illustrated in the upper part of FIG. 11. Under control of the reception control processing unit 21A, in a predetermined case, the reception buffer 21C outputs the held frame to the transmission unit 22.

The transmission unit 22 has a header adjusting unit 122A. The header adjusting unit 122 receives the held frame (that is, reception frame), replaces the data in the destination address field F1 in the reception buffer to the data in the source address field F2, and stores the "mirror return identifier" in the type field F3, thereby forming a mirror return frame as illustrated in the lower part of FIG. 11. For example, in the destination address field F1, the source address field F2, and the type field F3 of the mirror return frame, the address of the communication device 10, the address of the communication device 20, and the "mirror return identifier" are stored, respectively.

Operation Example of Communication System

An operation example of the communication system 1 of the third embodiment having the above configuration will be described.

Operation Example of Transmission Node

Figure 13:
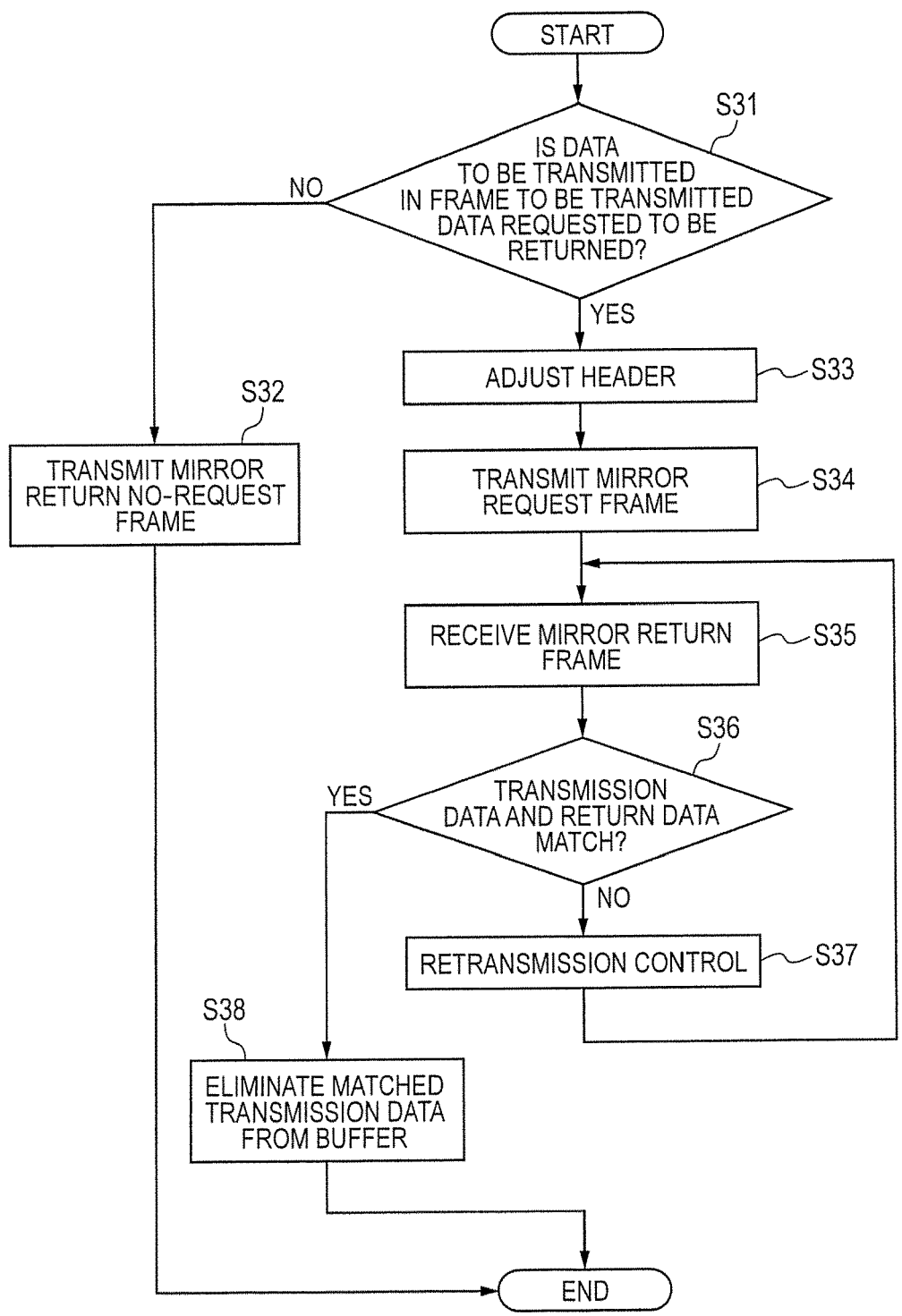
FIG. 13 is a flowchart illustrating an operation example of a transmission node of the third embodiment.

FIG. 13 is a flowchart illustrating an operation example of a transmission node of the third embodiment. Processes illustrated in the flowchart of FIG. 13 start at the time when, for example, the transmission unit 11 receives the frame to be transmitted from a layer higher than the data link layer.

First, the transmission control processing unit 111A of the transmission unit 11 in the communication device 10 as the transmission node determines whether the data to be transmitted in the frame to be transmitted received from the higher-level layer is data requested to be returned or not (step S31). For the determination, as described above, a transmission command added before the frame to be transmitted is used.

When the data to be transmitted is not data requested to be returned (NO in step S31), the transmission control processing unit 111A controls transmission of the frame to be transmitted so that it is transmitted as it is (step S32). For example, the transmission control processing unit 111A outputs a "header adjustment inexecution instruction" to the header adjusting unit 111B, and the header adjusting unit 111B eliminates only the transmission command and outputs the frame to be transmitted to the transmission buffer 11B. Consequently, the "mirror return not-requesting frame" are transmitted.

On the other hand, when the data to be transmitted is data requested to be returned (YES in step S31), the header adjusting unit 111B in the transmission unit 11 adjusts the header of the frame to be transmitted to the mirror return request header (step S33). Concretely, the header adjusting unit 111B deletes the transmission command from the frame to be transmitted and stores the mirror request identifier in the type field F3 in the header part P1 of the frame to be transmitted, thereby forming a mirror request frame.

Next, the header adjusting unit 111B outputs the mirror request frame to the transmission buffer 11B, thereby transmitting it toward the reception node (step S34).

After that, the reception unit 12 receives the mirror return frame. In step S36, the comparison unit 13 compares the data to be transmitted held in the retransmission buffer 14B and the return data included in the mirror return frame and determines whether the data matches or not (step S35).

When the data to be transmitted and the return data does not match (NO in step S36), the retransmission control processing unit 14A controls retransmission of the data to be transmitted held in the retransmission buffer 14B (step S37).

When the data to be transmitted and the return data matches (YES in step S36), the retransmission control processing unit 14A can estimate that the data to be transmitted can be properly received by the reception node and therefore controls to delete the frame to be transmitted held in the retransmission buffer 14B (step S38).

Operation Example of Reception Node

Figure 14:
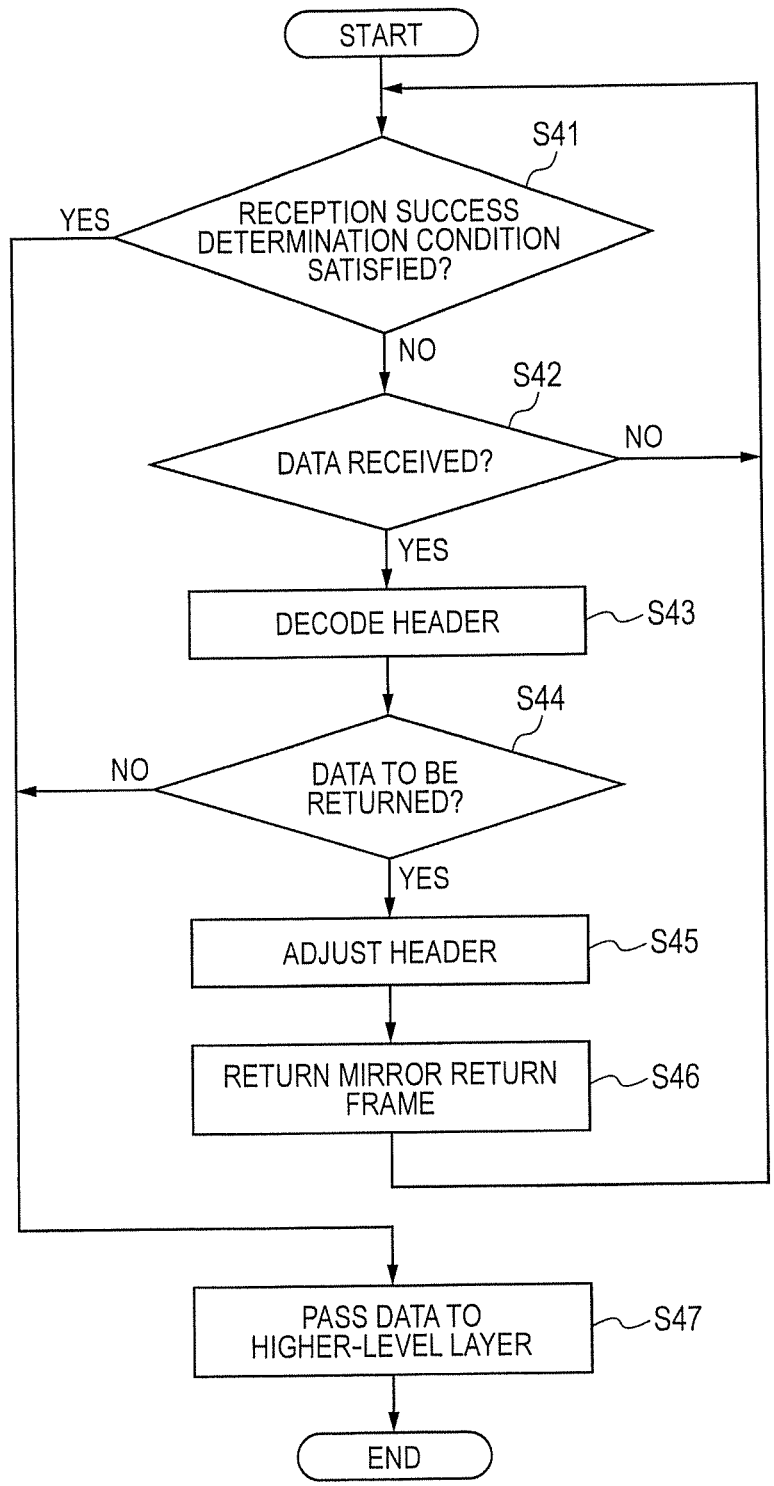
FIG. 14 is a flowchart illustrating an operation example of a reception node of the third embodiment.

FIG. 14 is a flowchart illustrating an operation example of the reception node of the third embodiment.

First, the reception control processing unit 121A in the reception unit 21 in the communication device 20 as the reception node determines, like in the step S21 in FIG. 5, whether the "reception success determination condition" is satisfied or not (step S41).

Next, in a manner similar to the step S22 in FIG. 5, the reception control processing unit 121A determines whether a frame is received or not (step S42).

When the frame is received (YES in step S42), the reception control processing unit 121A decodes the header without decoding the data part of the reception frame (step S43).

Subsequently, the reception control processing unit 121A determines whether the data included in the reception frame is data to be returned or not (step S44). In the determination, when the mirror request identifier is stored in the type field in the header of the reception frame, the data included in the reception frame is determined as data to be returned. On the other hand, when information other than the mirror request identifier is stored, it is determined that the data is not data to be returned.

When data included in the reception frame is not data to be returned (NO in step S44), the reception control processing unit 121A outputs the reception frame held in the reception buffer 21C to a layer (in this case, the data decoding unit 23) higher than the data link layer (step S47).

On the other hand, when the data included in the reception frame is data to be returned (YES in step S44), the reception control processing unit 121A outputs the frame held in the reception buffer 21C to the header adjusting unit 122A in the transmission unit 22. The header adjusting unit 122A adjusts the header of the frame received from the reception buffer 21C (step S45). Concretely, the header adjusting unit 122A replaces the data in the destination address field F1 in the header of the frame to the data in the source address field F2 and stores the "mirror return identifier" into the type field F3, thereby generating the mirror return frame.

Next, the header adjusting unit 122A outputs the mirror return frame to the transmission buffer 22A, thereby returning it toward the transmission node (step S46). The flow returns to step S41.

In a manner similar to that in step S22 in FIG. 5, for example, when the reception unit 21 does not receive retransmission data corresponding to the return data within predetermined time from the reference timing using the timing when the transmission unit 22 returns return data, the reception control processing unit 121A determines that the "reception success determination condition" is satisfied (YES in step S41). The reception control processing unit 121A outputs the reception frame held in the reception buffer 21C to a layer higher than the data link layer (step S47).

As described above, according to the third embodiment, in the communication device 10 as the transmission node, the transmission control processing unit 111A of the transmission unit 11 receives the "frame to be transmitted" in a state where the transmission command is added from the higher-level layer and, on the basis of the data of the transmission command, controls execution/inexecution of header adjustment by the header adjusting unit 111B. The transmission command indicates whether the data to be transmitted is data requested to be mirror-returned or not.

With the configuration of the communication device 10, the transmission control processing unit 111A can easily control the header adjustment by the header adjusting unit 111B only by checking the data of the transmission command.

The control data may be used as data requested to be mirror-returned, and data other than the control data (for example, audio data and image data), having the degree of importance lower than that of the control data may be set as data which is not requested to be mirror-returned. Consequently, the header adjustment by the header adjusting unit 111B can be made inexecuted on a frame including data having the low degree of importance, so that the process load on the communication device 10 as the transmission node can be reduced.

In the communication device 20 as the reception node, the header adjusting unit 122A of the transmission unit 22 forms a mirror return frame by replacing the data in the destination address field and the data in the source address field in the reception frame (that is, held frame) held in the reception buffer 21C.

With the configuration of the communication device 20, a mirror return frame can be formed in the specifications of a destination address and a source address used in the full-duplex communication network such as Ethernet (registered trademark). With the configuration of the communication device 20, also in the case where a relay node such as a router exists in a network line between the communication device 10 as a transmission node and the communication device 20 as a reception node, the mirror return frame can be made reach the communication device 10 as a transmission node with high probability.

Further, the header adjusting unit 122A of the transmission unit 22 stores a mirror return identifier in the type field of the header of the reception frame (that is, held frame) held in the reception buffer 21C, thereby forming a mirror return frame.

With the configuration of the communication device 20, the frame configuration used in the full-duplex communication network such as Ethernet (registered trademark) can be used, so that the mirror return frame which can be widely applied to the full-duplex communication network.

First Modification

Although the above description is based on the precondition that the communication device 20 replaces the data in the destination address field F1 and the data in the source address field F2 in the header of the reception frame and stores the mirror return identifier in the type field F3, thereby forming the mirror return frame, the invention is not limited to the above. For example, like the communication device 20 of the second embodiment, the reception frame may be set as it is as the mirror return frame.

Second Modification

In the above description, for example, as illustrated in the flowchart of FIG. 13, the communication device 10 as a transmission node determines whether or not the data to be transmitted in the frame to be transmitted is data requested to be returned in step S31 and, according to the determination result, switches the "no-mirror-request process flow" including the step S32 and the "mirror request process flow" including the step S33. For example, the communication device 10 as a transmission node may be configured so as to be able to set, as a mode in the data link layer, any one of "process flow switch mode (first mode)", "no-mirror-request mode (second mode)", and "mirror request mode (third mode)" to be described below. The "process flow switch mode (first mode)" is a mode of determining whether or not data to be transmitted in a frame to be transmitted is data requested to be returned and, according to the determination result, executing any one of the "no-mirror-request process flow" and the "mirror request process flow". The "no-mirror-request mode (second mode)" is a mode of executing the "no-mirror-request process flow" without determining whether or not data to be transmitted in a frame to be transmitted is data requested to be returned, that is, regardless of the type or the like of data. The "mirror request mode (third mode)" is a mode of executing the "mirror request process flow" without determining whether or not data to be transmitted in a frame to be transmitted is data requested to be returned. For example, as the process flow of the "mirror request mode (third mode)", the process flow of the transmission node described in the first and second embodiments may be used.

In the above description, for example, as illustrated in the flowchart of FIG. 14, the communication device 20 as a reception node determines whether or not data included in a reception frame is data to be returned in step S44 and, according to the determination result, switches the "no-return process flow" including step S47 and the "mirror return process flow" including step S45. For example, the communication device 20 as a reception node may be configured so as to be able to set, as a mode in the data link layer, any one of "process flow switch mode (fourth mode)", "no-return mode (fifth mode)", and "retransmission mode (sixth mode)" to be described below. The "process flow switch mode (fourth mode)" is a mode of determining whether or not data included in a reception frame is data to be returned and, according to the determination result, executing any one of the "no-return process flow" and the "mirror return process flow". The "no-return mode (fifth mode)" is a mode of executing the "no-return process flow" without determining whether or not data to be transmitted included in a reception frame is data to be returned, that is, regardless of the type or the like of data included in a reception frame. The "retransmission mode (sixth mode)" is a mode of executing the "mirror retransmission process flow" without determining whether or not data included in a reception frame is data to be retransmitted.

Other Embodiments (1) In the second and third embodiments, in the communication device 10, the transmission buffer 11B and the retransmission buffer 14B provided independently of each other. However, the configuration of the communication device 10 is not limited to the above. The transmission buffer 11B and the retransmission buffer 14B may be realized by one buffer.

(2) In the first to third embodiments, the configuration of the transmission node is illustrated as the configuration of the communication device 10, and the configuration of the reception node is illustrated as the configuration of the communication device 20. Obviously, each of the communication devices 10 and 20 may have both the configuration of the transmission node and the configuration of the reception node.

Figure 15:
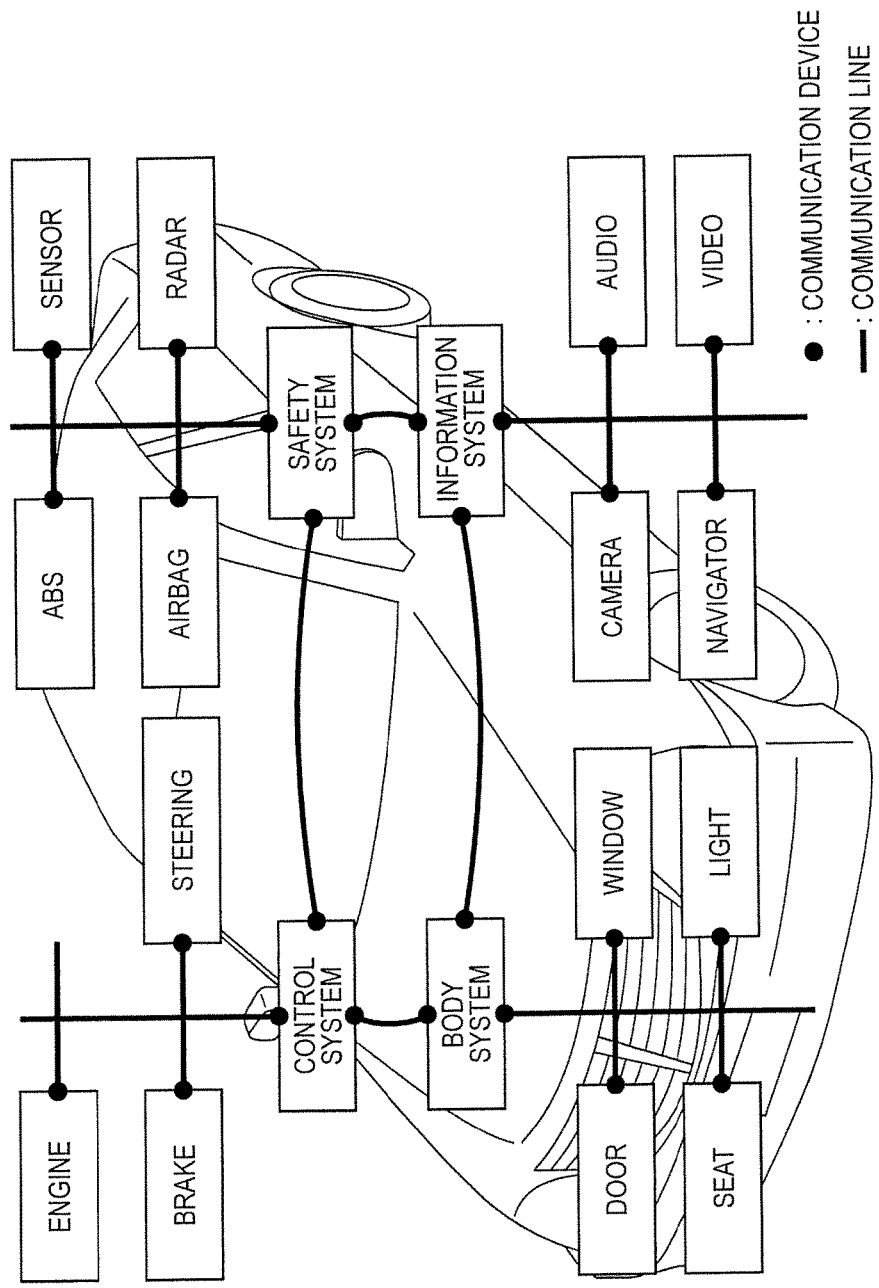
FIG. 15 is a schematic diagram of an in-vehicle network of another embodiment (3).

(3) The communication system 1 described in the first to third embodiments can be realized by various communication networks. That is, the communication devices 10 and 20 described in the first to third embodiments can be applied to various communication networks. An example of the communication network to which the communication devices 10 and 200 can be applied is an in-vehicle network. FIG. 15 is a schematic diagram of an in-vehicle network. As illustrated in FIG. 15, nodes included in the in-vehicle network can be roughly divided into a control system, a safety system, a body system, and an information system. For example, the control system includes an engine, a brake, and a steering, and the safety system includes an ABS, a sensor, an airbag, and a radar. The body system includes, for example, a door, a window, a seat, and a light, and the information system includes a camera, an audio, a navigation, and a video. In FIG. 15, solid circles indicate communication devices and solid lines express communication lines. As illustrated in FIG. 15, a number of communication devices are dispersed on the in-vehicle network. To two arbitrary communication devices transmitting/receiving data to/from each other in the number of communication devices dispersed on the in-vehicle network, the communication devices 10 and 20 described in the first to third embodiments can be applied.

According to two nodes on the communication network to which the communication devices 10 and 20 described in the third embodiment are applied, any of the modes described in the third embodiment (second modification) may be set to the communication devices 10 and 20. In this case, in a communication network (that is, the communication system 1), a plurality of communication devices set in different modes mixedly exist. For example, the communication network (that is, the communication system 1) may include a communication device in which only one of the "process flow switch mode (first mode)", the "no-mirror-request mode (second mode)", and the "mirror request mode (third mode)" is set (that is, a communication device which operates only as a transmission node). The communication network may include a communication device in which only one of the "process flow switch mode (fourth mode)", the "no-return mode (fifth mode)", and the "return mode (sixth mode)" is set (that is, a communication device which operates only as a transmission node). A communication device in which both one of the first, second, and third modes and one of the fourth, fifth, and sixth modes are set may be included. By making a communication device in which a mode other than the "mirror request mode (third mode)" is set included in a plurality of communication devices in a communication network as described above, traffic in the network can be reduced.

Figure 16:
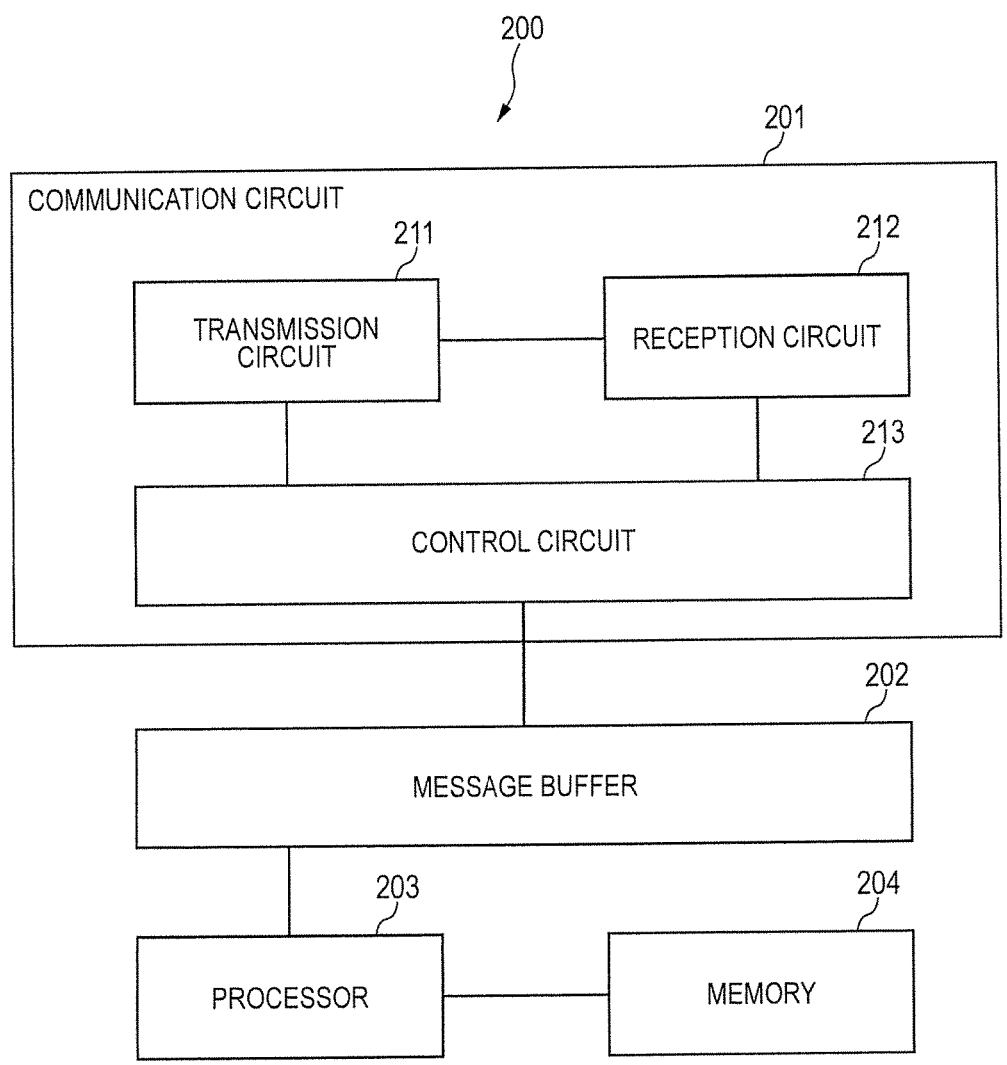
FIG. 16 is a diagram illustrating a hardware configuration example of a communication device of another embodiment (4).

(4) FIG. 16 is a diagram illustrating a hardware configuration example of a communication device. Each of the communication devices 10 and 20 described in the first to third embodiments can have the hardware configuration illustrated in FIG. 16.

In FIG. 16, a communication device 200 has a communication circuit 201, a message buffer 202, a processor 203, and a memory 204. The communication circuit 201 has a transmission circuit 211, a reception circuit 212, and a control circuit 213.

The transmission unit 11 and the reception unit 12 of the communication device 10 described in the first to third embodiments are realized by the transmission circuit 211 and the reception circuit 212, respectively. The comparison unit 13 and the retransmission control unit 14 of the communication device 10 are realized by the control circuit 213. A process unit in the higher-level layer in the communication device 10 is realized by, for example, reading and executing a program stored in the memory 204 by the processor 203.

The reception unit 21 and the transmission unit 22 of the communication device 20 described in the first to third embodiments are realized by the reception circuit 212 and the transmission circuit 211, respectively. A process unit (for example, the data decoding unit 23) in the higher-level layer in the communication device 20 is realized by, for example, reading and executing a program stored in the memory 204 by the processor 203.

Although the present invention achieved by the inventors herein has been concretely described above on the basis of the embodiments, obviously, the present invention is not limited to the forgoing embodiments but can be variously changed without departing from the gist.

What is claimed is:

1. A communication device comprising:
   a transmission unit transmitting first data toward a communication party;
   a reception unit receiving data which is a first data mirror-returned from the communication party, as second data;
   a comparison unit, as a process unit in a data link layer, electrically connected with the transmission unit and the reception unit, and comparing the first data from the transmission unit with the second data from the reception unit; and
   a retransmission control unit, as a process unit in the data link layer, electrically connected with the comparison unit and the transmission unit, and controlling retransmission of the first data using the transmission unit toward the communication party if there is a mismatch between the first data and the second data as a result of comparison by the comparison unit.

2. The communication device according to claim 1,
   wherein a header is added to the first data, and
   wherein the header includes a mirror return request requesting the communication party to return the received first data in a reception state.

3. The communication device according to claim 2,
   wherein the header includes a destination address field, a source address field, and a type field, and
   wherein the transmission unit has a header adjusting unit of mapping the mirror return request into the type field of the header added to the first data.

4. The communication device according to claim 3,
   wherein the transmission unit, the reception unit, the comparison unit, and the retransmission control unit are process units in a data link layer.

5. The communication device according to claim 4,
   wherein when information indicating that the first data is the data requested to be mirror-returned is received from the process unit in a layer higher than the data link layer, the header adjusting unit maps the mirror return request into a type field in the header added to the first data.

6. A communication device comprising:
   a reception unit as a process unit in a data link layer, receiving data transmitted from a communication party;
   a transmission unit as a process unit in the data link layer, electrically connected with the reception unit, and mirror-returning the received data in a received state from the reception unit toward the communication party; and a reception control processing unit in the reception unit, wherein if the reception control processing unit determines that retransmission data corresponding to the mirror-returned received data is not received by the reception unit within a predetermined period after the received data is mirror-returned toward the communication party, the reception processing control unit controls outputting of the received data to an upper layer.

7. The communication device according to claim 6, wherein a header is added to the received data, and wherein when a mirror return request requesting return of the received data in a received state included in the header, the transmission unit transmits the received data.

8. The communication device according to claim 7, wherein the reception unit has:

a reception buffer holding the received data; and the reception control processing unit decoding the header added to the received data and determining whether the mirror return request is included in the header or not, and wherein the reception control processing unit, when the mirror return request is included in the header, outputs data held in the reception buffer to the transmission unit, thereby making the transmission unit return the held data, and wherein in the case where, after return of the held data, a determination condition that the received data matches data transmitted from the communication party is satisfied, the reception control processing unit makes the reception buffer output the held data to a data decoding unit.

9. The communication device according to claim 8, wherein the header includes a destination address field, a source address field, and a type field, and wherein the transmission unit has a header adjusting unit of replacing data in a destination address field and data in a source address field of a header added to the held data received from the reception buffer and storing a mirror return identifier in the type field.

10. A retransmission control method comprising the steps of:

transmitting first data toward a communication party by using a transmission unit;

receiving data, which is the first data mirror-returned from the communication party, as second data, by using a reception unit;

comparing the first data from the transmission unit with the second data from the reception unit in a data link layer by using a comparison unit electrically connected with the transmission unit and the reception unit; and controlling retransmission of the first data using the transmission unit in a data link layer, if the first data and the second data does not match as a result of the comparison by the comparison unit.

* * * * *